US005527418A

United States Patent [19]

Ginsberg

[11] Patent Number: 5,527,418

[45] Date of Patent: Jun. 18, 1996

[54] APPARATUS FOR FOLDING AND SEALING A ONE PIECE MAILER

[75] Inventor: Jacob J. Ginsberg, Newton Centre, Mass.

[73] Assignee: Transkrit Corporation, Roanoke, Va.

[21] Appl. No.: 388,217

[22] Filed: Feb. 13, 1995

[51] Int. Cl.[6] .................................................. B32B 31/00

[52] U.S. Cl. .................. 156/443; 156/441.5; 156/442.1; 156/227; 156/578; 118/258; 493/419

[58] Field of Search ................................ 156/443, 441.5, 156/442.1, 442.2, 217, 227, 578; 493/419, 420, 421; 118/258, 259, 260, 264, 268

[56] References Cited

U.S. PATENT DOCUMENTS 3,416,785 12/1968 Sherman .............................. 493/420 X 4,428,794 1/1984 Hayskar et al. ..................... 156/442.1

4,573,672 3/1986 Lehmann et al. ................... 493/420 X 4,875,965 10/1989 Marzullo .......................... 156/441.5 X

*Primary Examiner*—James Engel

*Attorney, Agent, or Firm*—McAulay Fisher Nissen Goldberg & Kiel

[57] ABSTRACT

The apparatus for folding and sealing a one piece mailer is of compact construction for mounting on a desktop. The feed path for a mailer includes the curvilinear guide path for guiding the mailer from one horizontal path into a second horizontal path above the first horizontal path. Stops are provided to stop movement of the mailer at the end of the second horizontal path. A first water applicator applies water or a moistening solution to adhesive on the edges of the moving mailer while a second water applicator applies water or a moistening solution to a leading transverse edge of the mailer. Folding rollers are provided to fold the mailer in half or in thirds.

24 Claims, 6 Drawing Sheets

APPARATUS FOR FOLDING AND SEALING A ONE PIECE MAILER

This invention relates to an apparatus for folding and sealing a one piece mailer.

As is known, various types of machines have been provided for folding letters and mailers, for example for subsequent stuffing into envelopes or for folding and sealing into a mailer. For example, folding machines have been known which are of a buckle chute type wherein a sheet of paper can be folded in thirds. In such machines, the paper sheet is directed against a first stop in a first fold pan, buckled at an intermediate point and then passed between two rollers to effect a first fold while being directed into a second fold pan. The papers sheet is then directed against a stop in the second fold pan, buckled at a second point, passed between two rollers to effect a second fold and passed from the folding machine.

Folding machines have also been known to employ adhesive applying means so that adhesive can be applied to the sheets of paper during a folding operation. An example of such a folding machine is described in U.S. Pat. No. 5,228,014.

Still further, U.S. Pat. No. 4,551,684 describes an apparatus for folding and sealing a mailer blank which includes a water applicator for activating moistenable glue strips or lines which have been previously applied to the mailer blank prior to folding of the blank into a mailer.

Typically, the machines which have been used to fold and seal a mailer blank of the above types have been of rather large construction, particularly for high volume output.

Accordingly, it is an object of the invention to provide a compact apparatus for folding and sealing a mailer.

It is another object of the invention to provide a desk-top apparatus for the folding and sealing of one piece mailers.

It is another object of the invention to provide an apparatus for folding and sealing one piece mailers of compact construction for low volume use.

Briefly, the invention provides an apparatus for folding and sealing a one piece mailer which is of compact construction. The apparatus may be used as an electro-mechanical device which can be operated using very simplistic operational controls so as to permit all of the functions of the apparatus to be performed with relative ease. The compact nature of the apparatus permits use on a desk top. Further, the apparatus is able to operate at a relatively low noise level so as to permit use in an office environment.

The apparatus may also be interconnected with business type machines such as laser printers and the like so as to directly receive mailers which have been printed with text.

The apparatus includes a housing, feed means within the housing for conveying a one piece mailer having a water-activatable on each longitudinal edge and on a leading transverse edge along a first horizontal path and a water applicator for applying water to each longitudinal edge of the mailer passing from the feed means and along the horizontal path. The housing is provided with an input port so as to receive a tray containing a stack of mailers which are to be folded and sealed or to receive a series of mailers which are fed from a laser printer or other type of printer.

The apparatus has a first guide defining a curvilinear guide path for receiving and guiding a mailer from the horizontal guide path into a second horizontal path above the first horizontal path. In addition, a horizontally movable carriage is mounted in the housing with a stop means thereon for arresting movement of a mailer in the second horizontal guide path. A water applicator is provided on the carriage for applying water to the leading edge of a mailer abutted against the stop means on the carriage. This water applicator may utilize a tank for receiving water and a roller in the tank for transferring water from the tank to the underside of a leading edge of a mailer.

In addition, the water applicator roller may be driven from a transmission which also serves to drive the feed means of the apparatus. In this respect, the transmission includes a gear wheel which is rotatably mounted in the housing adjacent to the feed means and a drive cable which extends from the gear to the roller in the tank of the water applicator in order to provide a driving force to the roller. The cable is also flexible and of a length to accommodate horizontal movements of the carriage within the housing for different sized mailers. Thus, should the carriage be moved to accommodate a mailer of a lesser or greater length, there is no need to make adjustments in the drive connection between the drive roll and the transmission as the flexible cable simply moves along with the carriage.

A second guide is also provided to define a second curvilinear guide path below the feed means and the first curvilinear guide path for receiving a first folded part of a mailer. A stop is mounted within this second guide path to arrest movement of the folded part of the mailer therein and is movable along the curvilinear guide path to be adjusted to different lengths of a mailer.

A set of conveying and folding rollers is also provided within the housing for feeding a mailer from the feed means sequentially into the first guide and then into the second guide in order to effect a first folding of the mailer and to thereafter effect a second folding of the mailer while delivering the mailer from the housing. Additional rollers are also used on the output side of the housing to guide and deliver the folded mailers from the apparatus, for example, onto an output ramp.

The arrangement of the two curvilinear guide paths, feed means and set of conveying and folding rollers is such that a limited amount of space is required within the housing to accommodate these elements and to effect folding and sealing operations of the mailers. For example, the housing can be constructed so as to have overall dimensions of about 10½ by 14 inches and a height of about 9 inches. Such an apparatus is capable of folding mailers of 8½ by 11 to 8½ by 14 inches. Mailers of a longer length may be accommodated by making the curvilinear guide paths longer. Likewise, mailers of narrower or wider widths may be accommodated.

The arrangement of the various elements within the housing is such that none of the elements need project from the housing. As such, the housing is of box-like shape with an outward appearance of a cube-like structure without any projecting folding plates or the like with the exception of an input tray and an output ramp.

The apparatus may also be modified so as to fold and seal mailers in half rather than in thirds. To this end, a guide may be provided adjacent the set of conveying and folding rollers in order to move between an extended position to direct a mailer which has been folded in half out of the housing and a retracted position to permit passage of a folded part of a mailer into the second guide path for further processing into a mailer having two folds.

Still further, the apparatus may be modified so as to apply adhesive to a mailer at the time of folding. In such cases, rather than applying water, an adhesive solution or the like may be applied to the mailer during travel into the folding rollers with or without the addition of glue along the forward edge of the mailer.

These and other objects and advantages of the invention will become more apparent from the following detailed description taken in conjunction with the accompanying drawings wherein.

Figure 4:
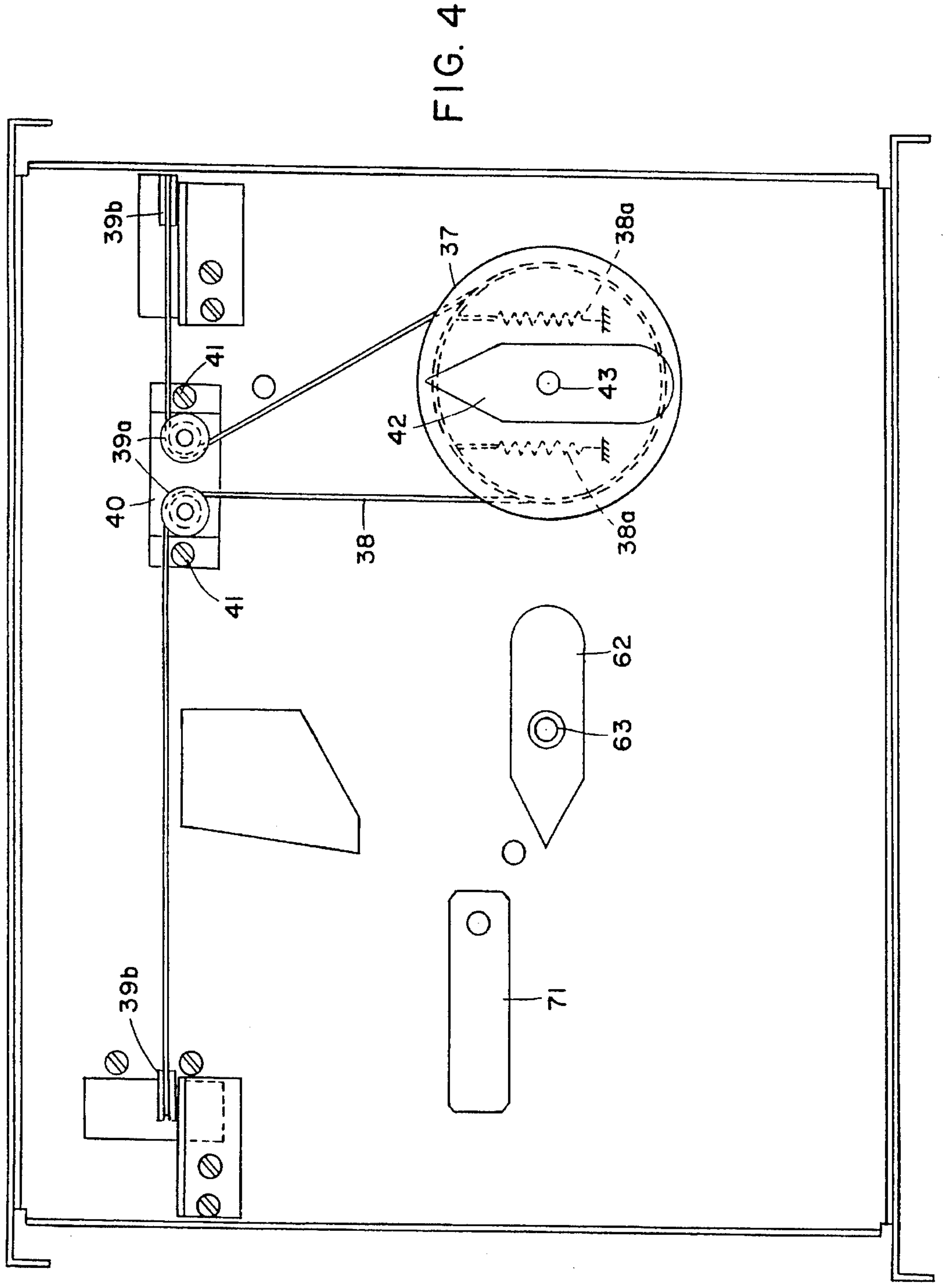
Figure 5:
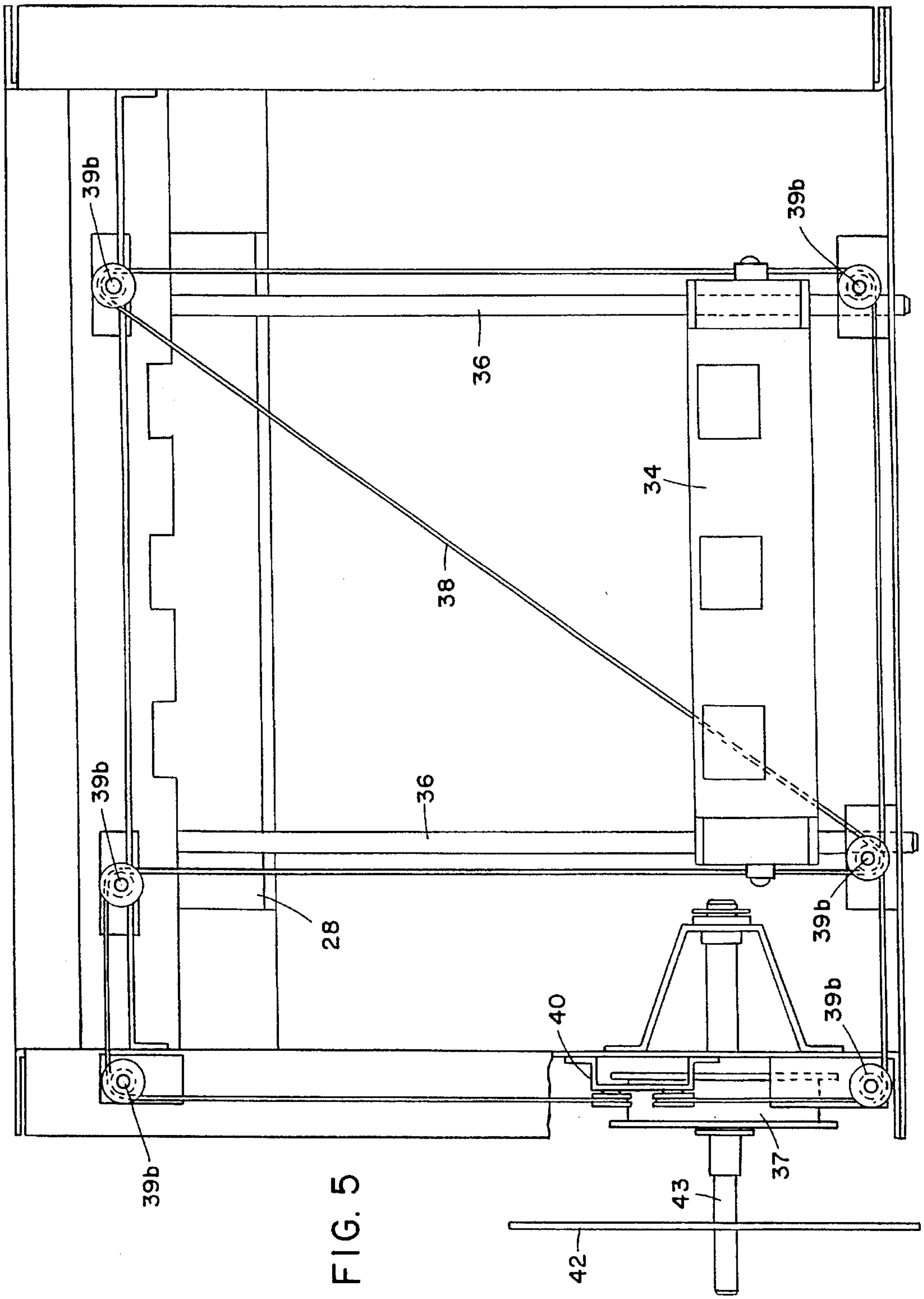
Figure 6:
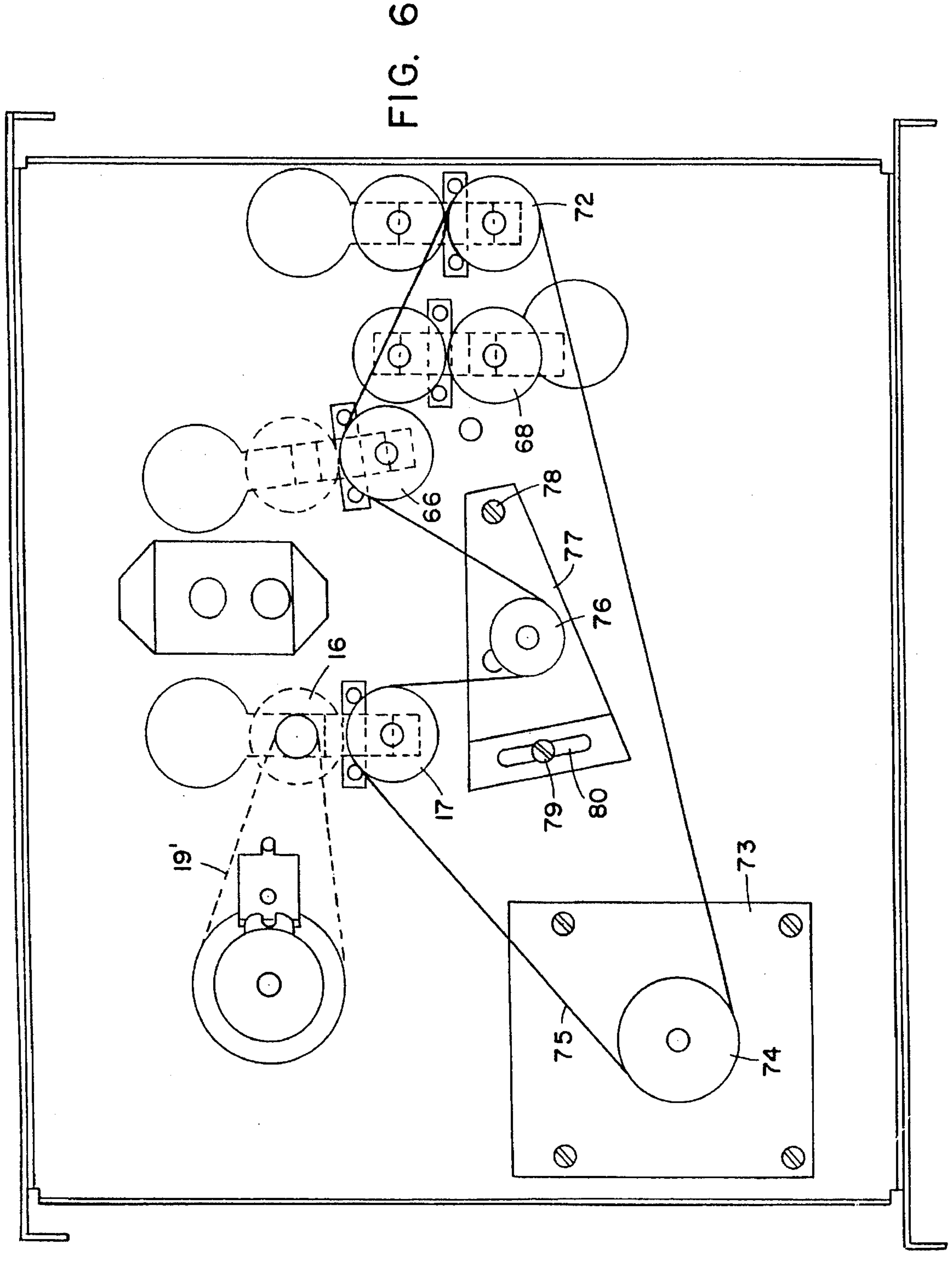

FIG. 4 schematically illustrates a side view of the apparatus and a cable means for moving the horizontally movable carriage in accordance with the invention;

FIG. 5 illustrates a plan view of the apparatus and of the cable means for moving the horizontally movable carriage; and FIG. 6 schematically illustrates a transmission arrangement employed in the apparatus for driving the various rollers.

Figure 1:
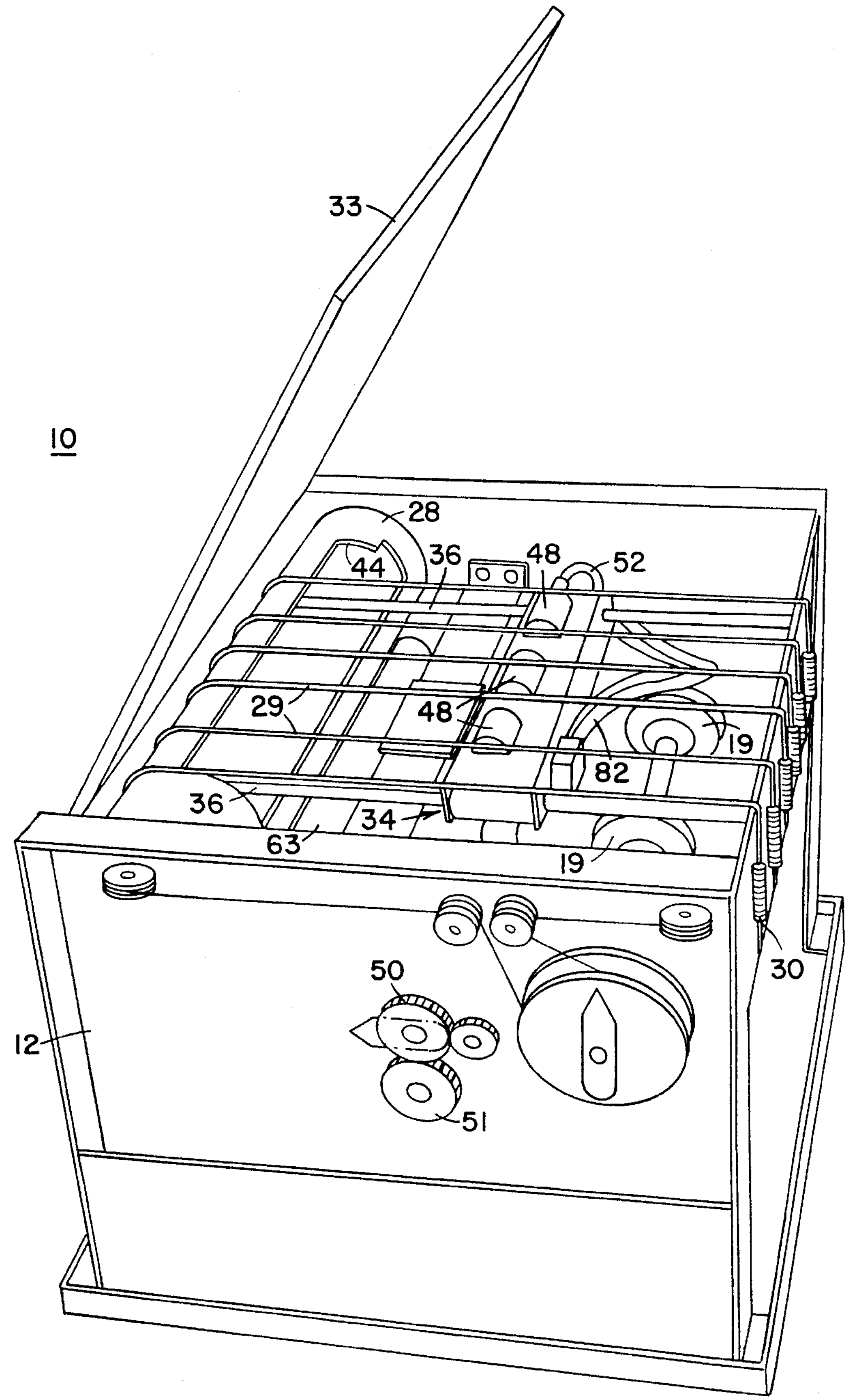
FIG. 1 illustrates a perspective view of a partially opened folding and sealing apparatus in accordance with the invention.

Referring to FIG. 1, the apparatus 10 for folding and sealing a one-piece mailer 11 (see FIG. 3) has a housing 12 of generally cubic box-like shape. The housing 12 is of compact construction so as to process one piece mailers of a conventional shape of 8½"×11" and 8½"×14" into a folded and sealed mailer. To this end, use may be made of one piece mailers such as described in U.S. Pat. No. 4,951,864 wherein each mailer has a water activatable glue on each longitudinal edge as well as on a leading transverse edge.

Figure 3:
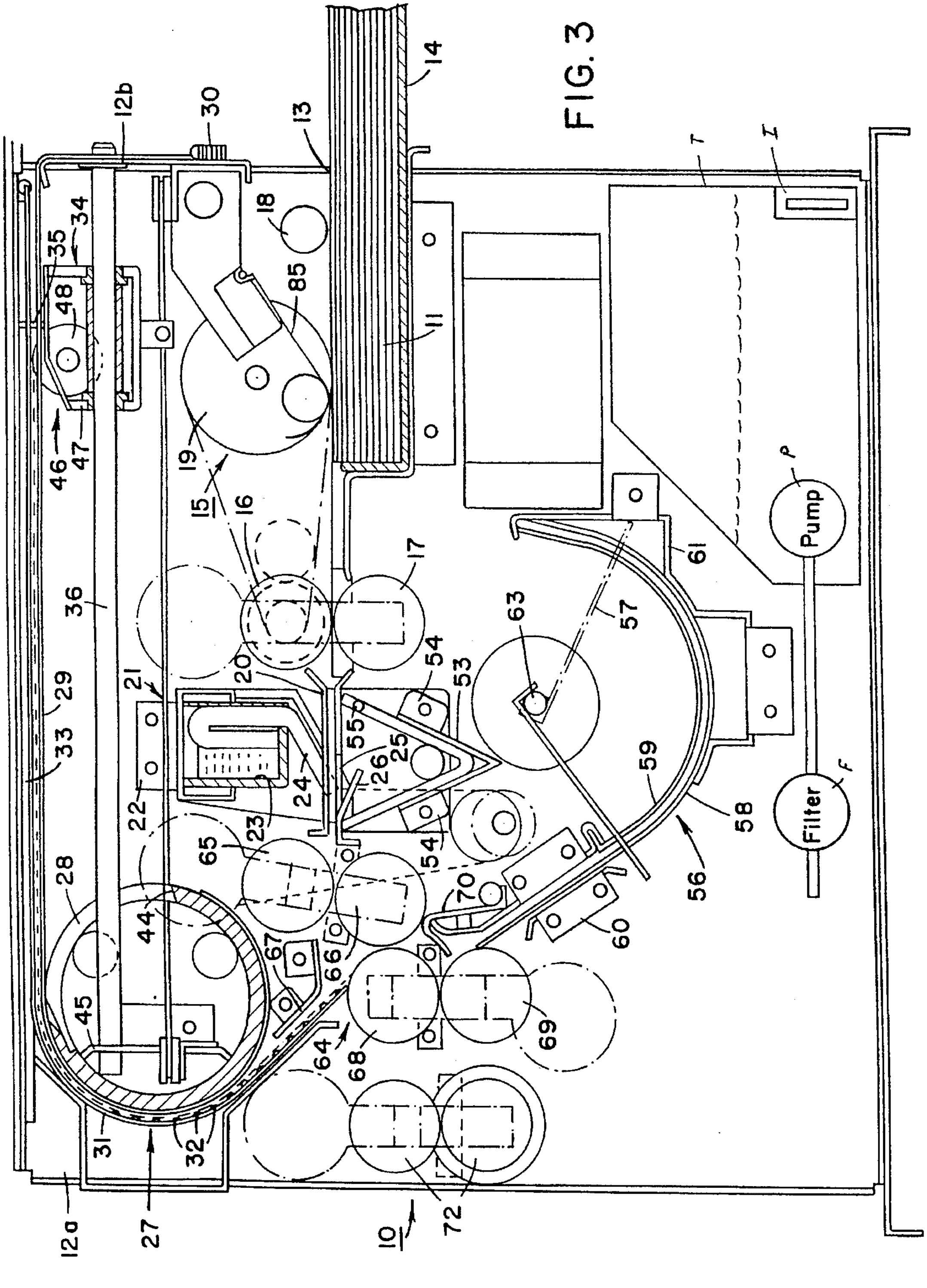
FIG. 3 illustrates a cross sectional side view of an apparatus constructed in accordance with the invention.

Referring to FIG. 3, the housing 12 includes an inlet port 13 through which a tray 14 containing a stack of one piece mailers 11 can be inserted into the housing 10. Such a tray 14 may be of conventional structure so as to bias the stack of mailers in an upward direction, as viewed, at the forward end. Since such a tray is of conventional structure, no further description is believed to be necessary.

As shown, the apparatus 10 employs a feed means 15 within the housing for sequentially conveying a series of mailers 11from the stack in the tray 14 along a first horizontally disposed path. This feed means 15 includes a pair of feed rollers 16, 17 which define a nip through which a mailer 11 is passed, serve to hold down the stack of mailers 11 in the tray 14 and a driven roller 19 for moving the top mailer 11 in the stack into the nip between the feed rollers 16, 17. In this respect, the driven roller 17 moves the mailer 11 at the slower linear speed than the rollers 16, 17 to create a gap between successive mailers.

A suitable transmission including a timing belt 19 (FIG. 6) is provided to drive the roller 19 and feed rollers 16, 17.

In addition, the feed means 15 includes at least two pairs of guide plates 20 extending from the feed rollers 16, 17 to guide the respective longitudinal edges of a mailer 11 passing therethrough.

The apparatus 10 also includes a water applicator 21 mounted in the housing 12 via suitable brackets 22 on opposite walls of the housing 12 for applying water to each longitudinal edge of a mailer 11 passing from the feed rollers 16, 17 and along the horizontal path. As indicated, the water applicator 21 includes a wetting tank 23 for receiving water and a pair of wicks 24 (only one of which is shown) which extend from the tank 23. As indicated, each wick 24 extends downwardly adjacent the upper guide plates 20 of the feed means 15 to wet the mailer 11 passing thereby. In particular, the end of each wick 24 extends through or by the upper guide plate 20 to a point slightly above the lower guide plate 20 in order to apply water to the glue on the longitudinal edge of the mailer 11 passing thereby.

As shown in FIG. 3, each wick 24 is in the form of a collection of capillary tubes which drip at all times. That is, each wick 24 is characterized in providing a flow-through action of the moistening solution (water) to create a drip at a slow pace/rate of the moistening solution upon the adhesive line so as to combine the solution and adhesive into a sealing material. This wick 24 provides excellent moistening control as well as eliminating any build up of residue of the adhesive since the constant flow-through drip action keeps the wick clean. This is contrary to normal wicking material, such as wool or felt, wherein the moisture is retained within the material until physical contact is made with a moving surface to draw the moisture off or out of the tip of the material.

The level of the water in the wetting tank 23 is maintained at a predetermined level in order to control the fluid flow through the wicks 24. For example, the higher the water level, the higher the fluid flow through the wicks 24. In order to maintain the water level constant, a pump is used to pump water from a main tank T to the wetting tank 23 while a drain is provided in a drip tray 53 located below the wetting tank 23 to recycle the water to the main tank T.

The wetting tank 23 is also removable from the housing 12 in order to permit a manual adjustment of the length of the wicks 24 relative to the water level.

The lowermost guide plate 20 is provided with an opening 25 below the wick 24 so that the dripping water from the wick 24 will drip into the drip tray 53 as described below when no mailer passes under the wicks 24. A ramp 26 also extends in a downward direction from the plate 20 below the opening 25 so as to guide the wetted edge of the mailer 11 back into the horizontal path should the edge deflect therefrom.

Referring to FIG. 3, the apparatus 10 also includes a first guide 27 which defines a curvilinear guide path for receiving and guiding a mailer 11 from the horizontal guide path into a second horizontal path above the first horizontal path. For example, the guide 27 is formed of a stationary curved plastic body 28 having a cylindrical surface about which the mailer 11 can be deflected, for example over an angle of 180°. In addition, a plurality of parallel wires 29 made of a suitable material such as a plastic, for example, Teflon, are disposed transversely on and about the cylindrical surface of the stationary body 28 in order to guide the mailer thereon during travel through the curvilinear guide path. These wires 29 serve to space the mailer 11 from the cylindrical surface of the stationary body 28 so as to avoid a large surface-to-surface area of contact between the mailer 11 and body 28 which might otherwise cause a drag of the mailer 11 on the body 28. Each wire 29 is fixed at one end adjacent the body 28 and secured at an opposite end to a spring 30 which is mounted on the outside of the housing 12 and which maintains the wire 29 under tension (see FIG. 1 ).

In addition, a curved plastic guide plate 31 is spaced from and about the stationary body 28 to guide a mailer 11 between the wires 29 and the guide plate 31. Further, this guide plate 31 is provided with a plurality of dimples 32, for example of hemispherical shape for guiding of the mailer 11 thereon in a point-to-point relationship rather than a surface-to-surface relation with the guide plate 31. The dimples 32 on the guide plate 31 provide less contact with the moving mailer 11. This, in turn, eliminates surface tension which is particularly important when moisture is on or within the mailer 11 and which may otherwise cause a braking action or a restriction of the moving mailer in a fixed path.

The housing 12 is provided with a cover plate 33 which is hingedly mounted on a side wall 12*a* of the housing 12 so as to be pivoted upwardly to expose the interior of the housing 12. In addition, the dimpled guide plate 31 which defines the first curvilinear guide path may be made of a flexible material so as to move with the housing cover 33 so that the stationary body 28 can be exposed for maintenance purposes.

Figure 2:
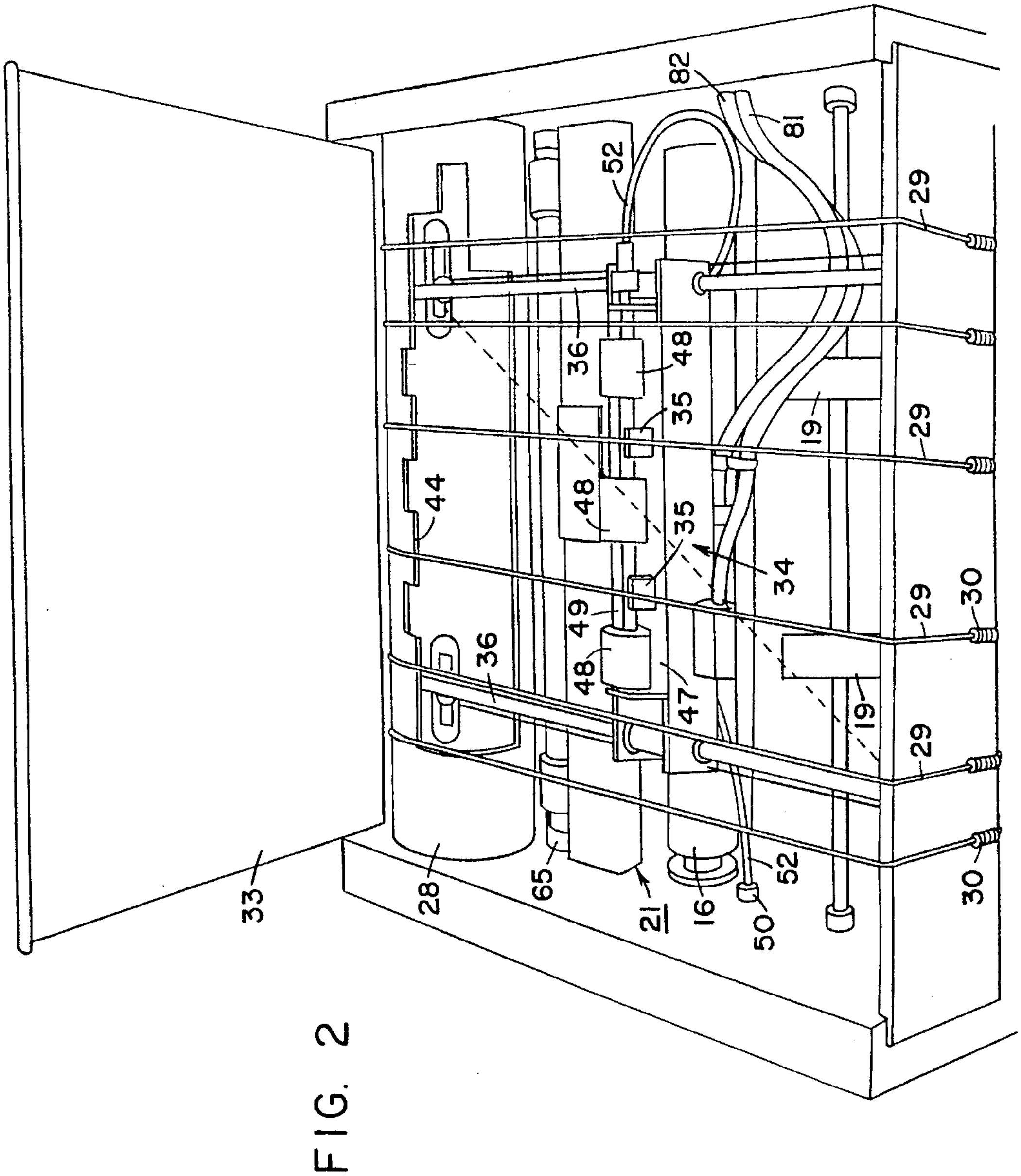
FIG. 2 illustrates a top perspective view of the apparatus of FIG. 1.

The apparatus 10 also includes a horizontally movable carriage 34 within the housing 12 which has a stop means 35 (see FIGS. 2 and 3) thereon for arresting movement of a mailer 11 in the curvilinear guide path. As shown in FIG. 2, the stop means 35 constitutes two vertically disposed spaced apart stops (e.g. plates) which are integral with the carriage 34 and which project into the guide path for a mailer 11. The carriage 34 is movably mounted on a pair of rails 36 of rod-like structure which extend across the top of the housing 12 so as to accommodate different lengths of mailers. For example, for an 8½×11" mailer, the carriage 34 would be positioned centrally of the housing 12 whereas for an 8½×14" mailer, the carriage 34 would be moved to a position (as shown) remote from the stationary body 28 to accommodate the greater length of the mailer. Movement of the carriage 34 may be made manually or may be carried out mechanically or electrically via a suitable drive means.

Referring to FIGS. 4 and 5, wherein like reference characters indicate like parts as above, the means for moving the carriage 34 includes a spool 37 which is rotatably mounted in the housing 12 and a cable 38 which is passed about the spool 37 to be driven thereby. The cable 38 is anchored at the ends to springs **38*a* and is lopped about various guide rollers 39*a*, 39*b* within the housing 12. As indicated in FIG. 5, the cable 38 has a diagonal run extending under the carriage 34 which is articulated to the carriage 34** via suitable means (not shown).

As shown in FIG. 4, the cable 38 loops about the spool 37 and passes about two guide rollers **39*a* which are rotatably mounted on a common housing 40 secured as by bolts 41 to the housing 12. Each roller 39*a* is disposed in a vertical plane and has a groove in which the cable 38 is received. In addition, a plurality of horizontally disposed rollers 39*b* are disposed on the housing so that the cable 38 is guided in a horizontal plane, as viewed, in FIG. 5 so as to loop about the housing 12**.

A knob 42 is mounted on a common shaft 43 with the spool 37 so as to turn the spool 37. For example, rotation of the knob 42 in a clockwise direction as viewed in FIG. 4 causes the spool 37 to move clockwise while at the same time causing the cable 38 to move in a corresponding direction so that the carriage 34 is moved from the rearmost position shown in FIG. 5 towards the opposite end of the housing 12 while sliding on the rails 36. Rotation of the knob 42 and spool 37 in the opposite direction causes an opposite movement of the carriage 34.

Referring to FIGS. 2 and 3, the rails 36 are secured at one end in a wall **12*b* of the housing 12 and at the opposite end pass through an enlarged opening 44 in the stationary body 28 to be secured to brackets 45 fixed within the stationary body 28**.

A water applicator 46 is also mounted on the carriage 34 for applying water to a leading transverse edge of a mailer 11 abutted against the stop means 35 in order to activate the glue thereat, for example, spaced apart patches or spots along the leading edge of a mailer 11. The water applicator 46 includes a tank 47 within the carriage 34 for receiving water and one or more rollers 48 (e.g. three mounted on a drive shaft 49 for transferring water from the tank 47 to an underside of the leading edge of a mailer 11. In this regard, the lower third of each roller 48 is disposed to be immersed in the water within the tank 47 as indicated so as to carry a thin layer of water while the upper portion is exposed to contact the mailer thereat. As indicated, each roller 48 is disposed adjacent to the stop means 35 and is continuously rotated.

A transmission (not shown) is also provided for driving the feed means 15 and the drive shaft 49 of the rollers 48 in the tank 47. For example, as shown in FIG. 1, the transmission includes a gear wheel 50 which is rotatably mounted in the housing 12 adjacent a gear 51 coupled with one of the feed rollers 16, 17 and a flexible drive cable 52 which extends from the gear wheel 50 to the drive shaft 49 (see FIG. 2) of the rollers 48 in the tank 47. This cable 52 is made of a length to accommodate the horizontal movements of the carriage 34 between the extreme positions of the carriage 34 for different size mailers. Thus, during movement of the carriage 34, there is no need to shift or change any gears to drive the driven rollers 48 within the water applicator tank 47. That is, the flexible drive cable 52 allows the rollers 48 to deliver water at any position of the tank 47 while eliminating the complexity of an elaborate gear and belt drive system.

The carriage 34 thus provides a dual function, that is, moistening of the leading edge of the mailer 11 and stopping of the mailer 11. This moistening of the adhesive on the leading edge of the mailer 11 and at the same time, stopping of the movement of the mailer 11 serves to properly position the mailer 11 for the first fold action to occur, for example at an imprinted fold mark on the mailer 11. The carriage 34 and, particularly, the stop means 35 mounted thereon, consistently stop the mailers 11 at the same positive position to achieve a subsequent folding of the mailers.

The main tank T (see FIG. 3) may be provided with a low level indicator I so as to indicate when the tank is about to run empty. In addition, the main tank T is provided with a submersible low voltage pump P which is provided in order to pump water into the wetting tank 23 to maintain a relatively constant level of water within the wetting tank 23 for application to the mailers 11.

A modular filter F or the like is also provided to filter any debris or other undesired materials from the water prior to passage into the tank 47.

The water circuit for the apparatus 10 includes the main tank T, the pump P for pumping water from the main tank T and the filter F downstream of the pump P. In addition, parallel water lines 81, 82 (see FIG. 2) extend from the filter F, one to the wetting tank 23 and one to the tank 47, in order to deliver water to each. Both of the tanks 23, 47 drain into the drip tray 53 either directly or via a suitable drain line, respectively. The drip tray 53, in turn, has a drain which connects via a suitable line to the main tank T to return the water for recycling.

As shown in FIG. 3, the drip tray 53 is in the form of an edge tank overflow return tray 53 located beneath the wicks 24 to collect excess solution that drips from the flow-through wicks 24 when no mailers 11 are passing and returns the solution to the main reservoir tank T via a return line. The return tray 53 is of V-shape and is mounted by a pair of brackets 54 in the apparatus 10 for a quick connection and may also be pivotally mounted about a hinge 55 at one end so as to permit removal of the tray 53 by pivoting downward to clear the wicks 24 and to then pull out (perpendicular to the plane of paper) adjustments relative to the wicks 24.

The apparatus 10 also includes a second guide 56 which defines a second curvilinear guide path below the feed means 15 for receiving a mailer 11 having a first fold therein as well as a stop 57 which is movably mounted along the second guide path to arrest movement of a mailer 11 therein. As indicated, the second guide 56 is defined by a pair of a plastic foam sheets 58, 59 which are of arcuate shape, for example, extending over an angle of approximately 150° and which are secured to the housing 10 via brackets 60.

These sheets 58, 59 are made of Lexan of a thickness of 0.020 inches and spaced apart so as to form a guideway to accommodate movement of a folded over end of the mailer 11 therebetween and are supported on a cradle frame 61 secured to the housing 12. The sheets 58, 59 may also be provided with dimples, as above, to eliminate surface tension.

The stop 57 is in the form of a pivotally mounted plate or plates which can be moved manually or automatically along the curvilinear guide path to positions suitable for arresting movement of a mailer. As indicated in FIG. 4, a dial 62 is mounted on a common shaft 63 with the stop 57 to the outside of the housing 12 to indicate the position of the stop 57.

The apparatus 10 also includes a set of conveying and feeding rollers 64 (i.e. four rollers) for feeding a mailer 11 from the feed means 15 sequentially into the first guide 27 and then into the second guide 56 to effect folding of the mailer 11 into thirds and then from tile housing 12. This set of rollers 64 includes a first pair of rollers 65, 66 for feeding a mailer 11 directly from the guide plates 20 of the feed means 15 into the first curvilinear guide 27. Where the lower roller 66 is positively driven, the upper roller 65 is gear driven from the lower roller 66 so as to rotate therewith. A guide plate 67 may also be disposed between the stationary body 28 of the curvilinear guide 27 to guide and support a mailer 11 having a window (not shown) therein during movement into the first guide 27. In addition, a third roller 68 is positioned adjacent the lower roller 66 of the pair of rollers 65, 66 in order to receive a first folded portion of a mailer extending into the first guide therebetween. That is, the third roller 68 is positioned so that when a mailer 11 is inserted into the first guide 27 and abuts against the stop means 35, the mailer 11 begins to buckle at a point above and adjacent the rollers 66, 68 and moves into the nip established between these two rollers 66, 68. With the two rollers 66, 68 rotating in opposite directions to each other, as indicated by the arrows, a fold is made in the mailer 11 and the mailer 11 is then moved downwardly into the second curvilinear guide 56.

A fourth roller 69 is also located below and adjacent to the third roller 68 to receive and convey a folded mailer therebetween out of the housing 12. In this respect, this fourth roller 69 is gear driven with the third roller 68 and is positioned so that when the folded mailer abuts against the stop 57 within the second curved path 56, the mailer begins to buckle below and adjacent the rollers 66, 68 the folded part of the mailer is moved into the nip between the third and fourth rollers 68, 69. These two rollers 68, 69 which rotate in opposite directions then grip the fold in the mailer 11 to move the mailer out of the housing 12.

A unique feature of the apparatus is the angular relationship between the curved mailer guide paths 27, 56 and the path of the mailer through the fold rollers 64, especially in the deflector area.

The apparatus as described is able to fold a one piece mailer into thirds. However, attachments may also be provided to accommodate the folding of a mailer 11 into halves. In this respect, a guide or gate 70 is positioned adjacent to the rollers 66, 68 which effect the first fold in a mailer for movement between an extended position, as shown in FIG. 3, to direct a folded mailer to between the third and fourth rollers 68, 69 for exiting from the apparatus 10 and a retracted position (not shown) to permit passage of the folded part of the mailer into the second curvilinear guide 55 for subsequent folding into thirds as described above. The gate 70 may be of digitated shape so as to project into corresponding guide grooves in the roller 66. This is to ensure that a mailer 11 is pulled off the roller 66 by the gate 70 for deflection via the rollers 68, 69 out of the housing 12.

The gate 70 for adjusting the apparatus for use in folding mailers in half or in thirds can be actuated, for example, manually by a lever 71 (FIG. 4) pivotally mounted on a side wall of the housing 12. Alternatively, the gate 70 may be adjusted automatically by a mechanical or electrical arrangement.

The apparatus 10 may also be provided with a pair of heated rollers 72 which are mounted in the housing 12 downstream of the conveying and folding rollers 64 in order to flatten a folded mailer passing therebetween. Such rollers may be made of steel and serve to eliminate any slight curvature in a mailer which has been processed within the apparatus 10. These steel rollers may be driven from the same transmission which serves to drive the set of conveying and folding rollers 64.

As indicated, the lower roller 72 may be hollow so as to be heated. The upper roller 72 is spring biased against the lower roller 72 in known manner. Both rollers 72 may be knurled so as to squeeze water from the longitudinal edges or seams of the folded mailers.

The apparatus 10 may also be provided with a chute or ramp (not shown) which extends from the housing 12 in a manner so as to receive mailers 11 which have been folded and ejected from the conveying and folding rollers 64 in a shingled fashion.

Sealing of the moistened-adhesive mailer 11 is accomplished by passing the folded mailer between the two knurled rollers 72 in order to press the folded portions of the mailer together. The knurling allows trapped air bubbles to form a waffle-like pattern which provides excellent surface-to-surface contact of the glue area. As is known, paper, when in a moist atmosphere, will tend to curl in the direction of the grain of the paper. This action is enhanced by the curved paper guide path. The knurled rollers 72 eliminate this curl so that the finished document is sealed flat.

Referring to FIG. 6, a suitable transmission is provided so that a single motor 73 is used to guide the various rollers of the apparatus 10. As indicated, the motor 73 employs a drive roller 74 which in turn drives an endless belt 75 about the rollers 17, 66 and 72 so as to positively drive each of these rollers. A suitable guide roller 76 is also provided within the housing 12 to form the drive belt 75 into a loop. This guide roller 76 is mounted on a brackets 77 each of which pivots about a pin 78 so that the tension in the belt 75 can be changed from time-to-time as required. A suitable screw 79 is also provided in a slot 80 of each bracket 77 to fix the bracket 77 in place.

In operation, the apparatus automatically feeds single sheets of papers from a stack, moistens specific locations of dry water soluble adhesive on the sheet, folds the sheet at either one or two points and then seals the sheet with compression and stacks the sheet.

The filter F (FIG. 3) in the moistening system removes particles of contaminate, such as paper dust, adhesive/glue particles, algae and the like which would be most likely to appear if plain tap water is used. The filter may be of the type which is easily cleaned or replaced at periodic intervals.

Instead of using water, a proprietary moistening solution containing a wetting agent and an algae inhibitor may be used. As a premixed solution, the moistening solution may provide a constant control factor. In addition, the solution may be provided in a concentrated form so as to be mixed with water by a user at the site of the use.

The housing 12 may also house the electronic controls (not shown) of the apparatus 10.

Additional devices may also be employed in the apparatus 10 for conventional purposes. For example, as shown in FIG. 3, a microswitch 85 is provided for sensing the presence of a mailer in the tray 14 in a position to be fed to the feed rolls 16, 17.

The invention thus provides an apparatus of compact construction which can be mounted on a desktop or other relatively small table. Further, the apparatus is capable of small volume use without the need for heavy duty components which may otherwise be required for a high volume use over extended periods.

Further, the invention provides an apparatus for folding and sealing a one piece mailer which is portable so as to be transported from place-to-place in an easily transported manner.

What is claimed is:

1. An apparatus for folding and sealing a one-piece mailer, said apparatus comprising a housing;

a tray within said housing for receiving a stack of one-piece mailers, each said mailer having a water activatable glue on each longitudinal edge and a leading transverse edge thereof;

feed means within said housing for sequentially conveying a series of mailers from said stack along a first longitudinally disposed path;

a water applicator in said housing for applying water to each longitudinal edge of a mailer passing from said feed means and along said horizontal path;

a first guide defining a curvilinear guide path for receiving and guiding a mailer from said horizontal path into a second horizontal path above said first horizontal path;

a horizontally movable carriage in said housing having a stop means thereon for arresting movement of a mailer in said curvilinear guide path;

a second water applicator on said carriage for applying water to a leading transverse edge of a mailer abutted against said stop means to activate the glue thereat;

a first pair of rollers for feeding a mailer from said feed means into said first guide;

a third roller adjacent one of said pair of rollers to receive a first folded portion of a mailer extending into said first guide therebetween; and a fourth roller below and adjacent said third roller to receive and convey a folded mailer therebetween out of said housing.

2. An apparatus as set forth in claim 1 wherein said first guide includes a stationary body having a cylindrical surface and a plurality of parallel wires disposed transversely on said cylindrical surface to guide a mailer thereon during travel through said curvilinear guide path.

3. An apparatus as set forth in claim 2 wherein said first guide further includes a curved guide plate spaced from and about said stationary body to guide a mailer therebetween.

4. An apparatus as set forth in claim 3 wherein said guide plate has a plurality of dimples thereon for guiding of a mailer.

5. An apparatus as set forth in claim 1 wherein said water applicator includes a tank for receiving water and at least one roller in said tank for transferring water from said tank to an underside of said leading edge of a mailer.

6. An apparatus as set forth in claim 5 which further comprises a transmission for driving said feed means and said roller in said tank, said transmission including a gear wheel rotatably mounted in said housing adjacent said feed means and a flexible drive cable extending from said gear to said roller in said tank, said cable being of a length to accommodate horizontal movements of said carriage in said housing for different sized mailers.

7. An apparatus as set forth in claim 1 which further comprises a second guide defining a second curvilinear guide path below said feed means for receiving a mailer having a first fold therein from said third roller and said one roller and a stop movably mounted along said second guide path to arrest movement of a mailer therein.

8. An apparatus as set forth in claim I which further comprises a guide adjacent said third roller for movement between an extended position to direct a folded mailer moving from between said third roller and said one roller to between said third and fourth rollers and a retracted position to permit passage of a folded part of a mailer into said second guide path.

9. An apparatus as set forth in claim 1 which further comprises a guide plate extending between said pair of rollers and said first guide to guide and support a mailer having a window therein during movement into said first guide.

10. An apparatus as set forth in claim 1 which further comprises a pair of heated rollers mounted in said housing downstream of said fourth roller to flatten a folded mailer passing therebetween.

11. An apparatus as set forth in claim 1 wherein said water applicator includes a tank for receiving water and a pair of wicks extending from said tank, each said wick extending downwardly to a point adjacent said feed means to wet a mailer passing thereby.

12. An apparatus as set forth in claim 11 wherein said feed means includes a pair of rotatable feed rollers for moving a mailer from said tray towards said first pair of rollers and at least one guide plate extending between said feed rollers and said first pair of rollers to guide a longitudinal edge of a mailer thereon, said guide plate being disposed below a respective one of said wicks.

13. An apparatus for folding and sealing a one-piece mailer, said apparatus comprising a housing;

feed means within said housing for conveying a mailer having a water-activatable glue on each longitudinal edge and a leading transverse edge thereof along a first horizontal path;

a first water applicator in said housing for applying water to each longitudinal edge of a mailer passing from said feed means and along said horizontal path;

a first guide defining a curvilinear guide path for receiving and guiding a mailer from said horizontal path into a second horizontal path above said first horizontal path;

a horizontally movable carriage in said housing having a stop means thereon for arresting movement of a mailer in said curvilinear guide path;

a water second applicator on said carriage for applying water to a leading transverse edge of a mailer abutted against said stop means to activate the glue thereat;

a second guide defining a second curvilinear guide path below said feed means for receiving a mailer having a first fold therein;

a stop movably mounted along said second guide path to arrest movement of a mailer therein; and a set of conveying and folding rollers for feeding a mailer sequentially into said first guide and said second guide to effect folding of the mailer and to deliver a folded mailer from said housing.

14. An apparatus as set forth in claim 13 wherein said first guide includes a stationary body having a cylindrical surface and a plurality of parallel wires disposed transversely on said cylindrical surface to guide a mailer thereon during travel through said curvilinear guide path.

15. An apparatus as set forth in claim 13 wherein said water applicator includes a tank for receiving water and at least one roller in said tank for transferring water from said tank to an underside of said leading edge of a mailer.

16. An apparatus as set forth in claim 15 which further comprises a transmission for driving said feed means and said roller in said tank, said transmission including a gear wheel rotatably mounted in said housing adjacent said feed means and a flexible drive cable extending from said gear to said roller in said tank, said cable being of a length to accommodate horizontal movements of said carriage in said housing for different sized mailers.

17. An apparatus for folding a one piece mailer, said apparatus comprising a housing;

a tray within Said housing for receiving a stack of one-piece mailers, each said mailer having a leading transverse edge;

feed means within said housing for sequentially conveying a series of mailers from said stack along a first longitudinally disposed path;

a water applicator in said housing for applying water to each longitudinal edge of a mailer passing from said feed means and along said longitudinally disposed path;

a first guide defining a curvilinear guide path for receiving and guiding a mailer from said horizontal path into a second horizontal path above said first horizontal path;

a horizontally movable carriage in said housing having a stop means thereon for arresting movement of a mailer in said curvilinear guide path;

a first pair of rollers for feeding a mailer from said feed means into said first guide to abut said stop means therein at said leading edge;

a third roller adjacent one of said pair of rollers to receive therebetween a first folded portion of a mailer extending into said first guide and abutted against said stop means; and a fourth roller below and adjacent said third roller to receive and convey a folded mailer therebetween out of said housing.

18. An apparatus as set forth in claim 17 wherein said first guide includes a stationary body having a cylindrical surface and a plurality of parallel wires disposed transversely on said cylindrical surface to guide a wetted mailer thereon during travel through said curvilinear guide path and a curved guide plate spaced from and about said stationary body to guide a wetted mailer therebetween.

19. An apparatus as set forth in claim 18 wherein said guide plate has a plurality of dimples thereon for guiding of a mailer therealong.

20. An apparatus as set forth in claim 17 which further comprises a second guide defining a second curvilinear guide path below said feed means for receiving a mailer having a first fold therein from said third roller and said one roller and a stop movably mounted along said second guide path to arrest movement of a mailer therein.

21. An apparatus as set forth in claim 17 wherein said water applicator comprises a tank for receiving water and a pair of wicks extending from said tank, each said wick extending downwardly to a point adjacent said feed means for applying water to a mailer passing thereby to activate glue thereon.

22. An apparatus as set forth in claim 21 wherein each wick includes a bundle of capillary tubes providing a flow-through drip action to create a drip at an end thereof adjacent said feed means.

23. An apparatus as set forth in claim 17 further comprises a second water applicator on said carriage for applying water to a leading transverse edge of a mailer abutted against said stop means to activate glue thereon.

24. An apparatus as set forth in claim 23 wherein said second water applicator includes a tank for receiving water and at least one roller in said tank for transferring water from said tank to an underside of said leading edge of a mailer; and a transmission for driving said feed means and said roller in said tank, said transmission including a gear wheel rotatably mounted in said housing adjacent said feed means and a flexible drive cable extending from said gear to said roller in said tank, said cable being of a length to accommodate horizontal movements of said carriage in said housing for different sized mailers.

* * * * *

UNITED STATES PATENT AND TRADEMARK OFFICE

CERTIFICATE OF CORRECTION

PATENT NO. : 5,527,418

DATED : June 18, 1996

INVENTOR(S) : JACOB J. GINSBERG

It is certified that error appears in the above-indentified patent and that said Letters Patent is hereby corrected as shown below:

Column 1, line 53 after "activable" insert -glue-

Column 3, line 36 change "serve" to -a roller 18 which serves-
Line 39 change "17" to -19-
Line 40 change "at the" to -at a-
Line 42 change "19" to -19'-

Column 6, line 57 change "to then pull" to -then by pulling-
Line 58 cancel "adjustments ... 24"

Column 7, line 19 change "tile" to -the-
Column 8, line 45 cancel "a"
Column 9, line 26 after "longitudinally disposed" insert -horizontal- Column 11, line 14 after "gear" insert -wheel-
Line 21 change "Said" to -said- Line 30 before "path" insert -horizontal- Signed and Sealed this Twenty-second Day of October, 1996

Attest:

BRUCE LEHMAN

*Attesting Officer* — *Commissioner of Patents and Trademarks*